United States Patent [19]

Charlton et al.

[11] 4,071,422
[45] Jan. 31, 1978

[54] PROCESS FOR CONCENTRATING AND RECOVERING GALLIUM

[75] Inventors: Thomas L. Charlton, Rossland; Robert F. Redden, Fruitvale; Horst E. Hirsch, Trail, all of Canada; Shou C. Liang, Spokane, Wash.

[73] Assignee: Cominco Ltd., Vancouver, Canada

[21] Appl. No.: 703,409

[22] Filed: July 8, 1976

[30] Foreign Application Priority Data

Apr. 15, 1976 Canada .................................. 250752

[51] Int. Cl.² .............................................. C25C 1/00
[52] U.S. Cl. ................................... 204/105 R; 75/120; 75/121; 423/106; 423/127; 423/158; 423/119
[58] Field of Search ............... 423/127, 106, 158, 122, 423/123, 119; 75/121, 120; 204/105 R

[56] References Cited

U.S. PATENT DOCUMENTS

| | | | |
|---|---|---|---|
| 1,855,455 | 4/1932 | McCutcheon | 204/105 R |
| 2,557,326 | 6/1951 | Tuwiner | 423/106 |
| 2,582,376 | 1/1952 | Frary | 204/105 R |
| 2,582,377 | 1/1952 | Brown | 204/105 R |
| 2,582,378 | 1/1952 | Brown | 204/105 R |
| 3,170,857 | 2/1965 | Dotzer | 75/121 |
| 3,904,497 | 9/1975 | Sleppy et al. | 204/105 R |

*Primary Examiner*—R. L. Andrews
*Attorney, Agent, or Firm*—Arne I. Fors

[57] ABSTRACT

Gallium and other values are recovered from phosphorus-furnace flue-dust by treating dust with sulfuric acid to form a solution and a residue. The residue may be treated for recovery of values. Zinc is precipitated from the solution as zinc ammonium sulfate hexahydrate and an alkaline material is added to precipitate a gallium concentrate and to form a gallium-free solution, which may be treated for recovery of sulfate and phosphate values. The gallium concentrate may be upgraded by mixing concentrate with lime to precipitate calcium phosphate and by subsequently adding sodium hydroxide to redissolve coprecipitated gallium and aluminum compounds. Residual precipitate is recycled and the solution is neutralized to precipitate an upgraded concentrate. Aluminum may be removed as calcium aluminate. Upgraded concentrate may be dissolved in alkaline solution and the solution electrolyzed for deposition and recovery of gallium.

24 Claims, 1 Drawing Figure

PROCESS FOR CONCENTRATING AND RECOVERING GALLIUM

BACKGROUND OF THE INVENTION

This invention relates to a process for concentrating gallium and, more particularly, relates to a process for concentrating and recovering gallium and recovering other valuable materials from dusts from the electric furnace production of phosphorus.

Gallium is found in association with zinc, germanium, aluminum and copper, and occurs in coals. Although the element gallium is relatively abundant, it is widely disseminated and, except in rare instances, the named sources often contain small concentrations only in the order of 0.001 to 0.02% gallium.

Many processes have been developed to concentrate gallium in the processing of ores of the above-named metals. For example, according to U.S. Pat. No. 1,855,455, which issued on Apr. 26, 1932, gallium is recovered from a zinc sulfide distillation reidue by treating the residue with hot, concentrated sulfuric acid, forming a solution containing gallium sulfate, treating the solution with hydrogen sulfide, electrolyzing the solution to deposit zinc, adding excess alkali and electrolyzing the solution to deposit gallium. According to U.S. Pat. No. 2,582,376, No. 2,582,377 and No. 2,582,378, which issued on Jan. 15, 1952, gallium is recovered from liquors from the Bayer aluminum process by insolubilizing some of the aluminum in the liquor as calcium aluminate, coprecipitating hydrated gallium oxide and alumina by introducing an acidic material such as carbon dioxide, dissolving the precipitate in alkali-metal hydroxide and electrolyzing the solution for deposition and recovery of gallium.

Gallium is also found in minuscule amounts in phosphate minerals and these amounts are somewhat concentrated during the processes for the production of elemental phosphorus. In these processes, for example, the gases leaving the electric furnaces are treated in precipitators for the collection of the flue dusts which contain gallium, as well as a large number of other elements, the most important of which are zinc, silver, cadmium, aluminum, phosphorous, sodium, potassium, calcium, fluorine, chlorine, silicon and carbon.

In U.S. Pat. application No. B 333,928, which was published on Jan. 28, 1975, there is disclosed a method of concentrating gallium from phosphorus-furnace treater-dust which comprises contacting the dust with an aqueous slurry of an alkaline-earth compound, separating the gallium-containing alkaline liquid from the dust and recovering the gallium from the liquid. The alkaline liquid may be carbonated to precipitate gallium, which may be recovered by known methods. The liquid may also be treated with hydrogen sulfide to form gallium-containing zinc sulfide, which may then be treated with acid and alkali to form a hydroxide precipitate from which the gallium may be recovered. This method has several disadvantages. The recovery of gallium is low. According to Example 1, 60% of the gallium in the dust remains in the residue and 60% (sic) of the gallium is extracted in the alkaline filtrate. According to Example 2, only 18.5% of the gallium in the dust is recovered in the final precipitate. No secondary or by-products appear to be recovered.

We have now found that phosphorus-furnace flue-dusts, named flue dust hereinbelow, can be treated for the concentration of gallium, for the economic recovery of gallium with high yields, and for the recovery of other values in the form of concentrates and solutions which can be further treated for the recovery of these values in valuable products.

Accordingly, it is an object of the present invention to provide a process for the recovery of values from flue dust.

It is another object to provide a process for treating flue dust for the separate recovery of metal values and fertilizer values.

It is a further object of the invention to provide a process for the concentration and recovery of gallium from flue dust.

These and other objects of the invention and the manner in which they can be attained will become apparent from the following detailed description of the process of the invention.

STATEMENT OF THE INVENTION

According to the invention, there is provided a first embodiment for a process for treating phosphorus-furnace flue dust containing gallium and zinc which comprises the steps of treating flue dust with sulfuric acid for formation of a leach solution and a leach residue, separating leach solution from leach residue, precipitating zinc in the leach solution in the presence of ammonium sulfate as zinc ammonium sulfate hexahydrate, separating precipitated zinc from the solution, adding a suitable alkaline material to said solution for precipitation of a first gallium concentrate and formation of a first gallium-free solution, and separating first concentrate from first gallium-free solution for recovery of said first gallium concentrate.

There is further provided a second embodiment for a process for treating phosphorus-furnace flue dust containing gallium, zinc and aluminum which comprises the process of the first embodiment and, additionally, a process for upgrading first gallium concentrate which comprises the steps of mixing said first gallium concentrate containing phosphate in a slurry with an amount of lime at least stoichiometric to the $P_2O_5$ content of the concentrate to form a precipitate containing calcium phosphate and coprecipitated gallium and aluminum compounds in a gallate-aluminate solution, adding an amount of a suitable alkaline material sufficient to raise the pH of the slurry to at least 11 whereby coprecipitated gallium and aluminum compounds are redissolved in the gallate-aluminate solution and whereby a residual precipitate remains, separating residual precipitate from the gallate-aluminate solution, neutralizing said gallate-aluminate solution with acid for precipitation of upgraded gallium concentrate and formation of a second gallium-free solution, and separating upgraded gallium concentrate from second gallium-free solution for recovery of upgraded gallium concentrate.

There is still further provided a third embodiment of the process of the invention which comprises the process of the second embodiment and, additionally, a process for the removal of aluminum from the gallate-aluminate solution prior to the precipitation of upgraded gallium concentrate and for the recovery of gallium metal from upgraded gallium concentrate which comprises the steps of adding a suitable calcium compound to said gallate-aluminate solution in an amount at least stoichiometric to the amount of aluminum in said solution for the precipitation of calcium aluminate and separating precipitated aluminate from the gallate solution and, after precipitating upgraded concentrate and separating upgraded concentrate from second gallium-free solution according to the second embodiment, dissolving said upgraded concentrate in an alkaline solution, electrolyzing alkaline solution of upgraded concentrate for deposition of gallium and formation of spent electrolyte, and recovering deposited gallium.

BRIEF DESCRIPTION OF DRAWING

The process will now be described in detail with reference to the accompanying drawing, which represents a flow-sheet of the steps of the overall, integrated process according to the three embodiments of the invention.

DESCRIPTION OF PREFERRED EMBODIMENTS

Figure 1:
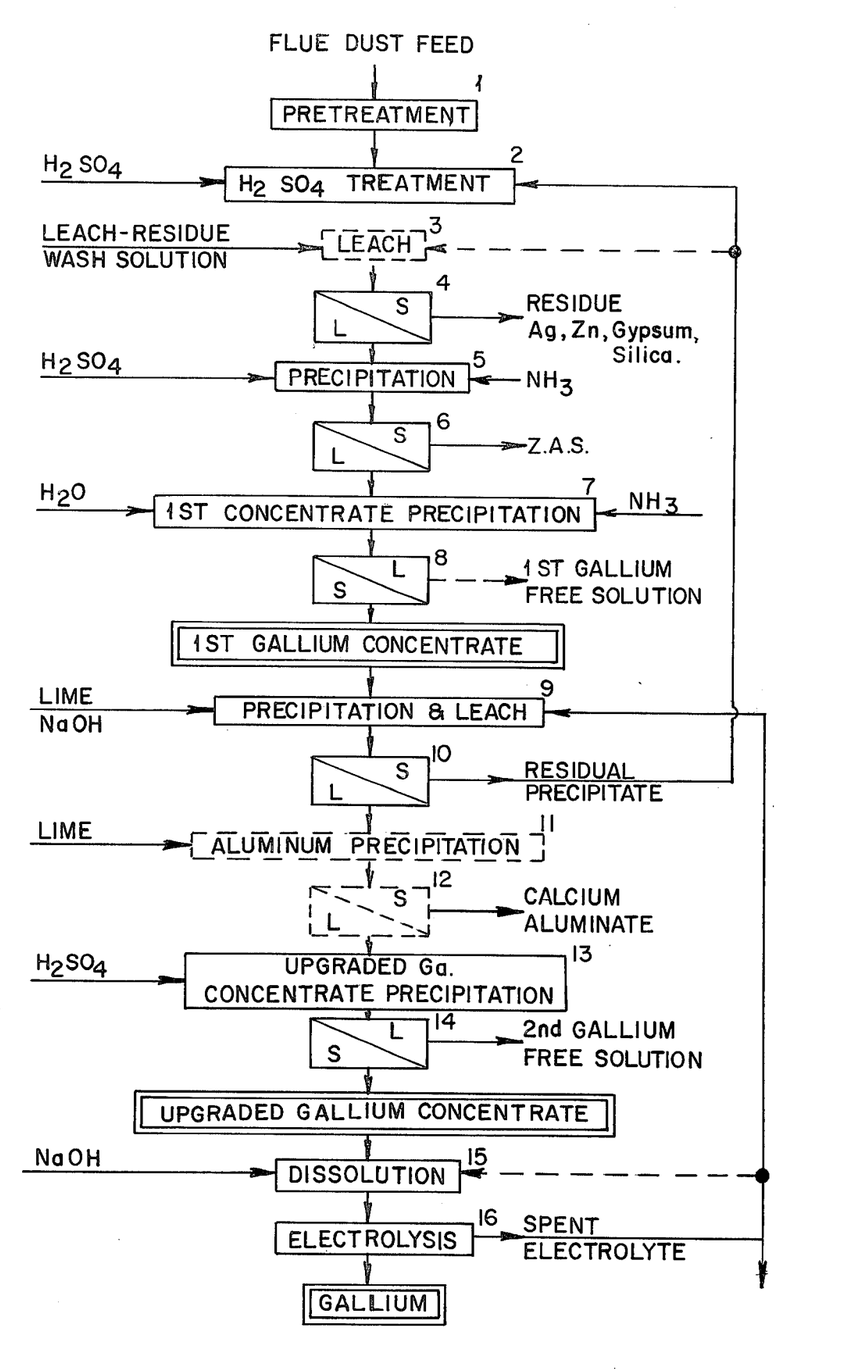

Flue dusts treated according to the process of the present invention are obtained from precipitators in the electric furnace production of elemental phosphorus and vary in composition depending on the composition of the phosphate minerals used. Such dusts may contain, for example, 0.02 to 0.05% Ga, 5 to 15% Zn, 0.5% Cd, 10 to 25 ounces per ton Ag, 1 to 4% $Al_2O_3$, 1 to 3% $Na_2O$, 5 to 25% $K_2O$, 7 to 12% CaO, 25 to 35% $P_2O_5$, 0.3 to 1.0% Cl, 13 to 19% $SiO_2$, 1 to 5% F and 5 to 20% $H_2O$. When removed from the precipitators and exposed to air, the dusts burn and partly fuse causing the formation of agglomerates with a very broad range of sizes. Agglomerates may reach sizes up to 12 to 18 inches. Such agglomerates are not suitable for direct processing. Flue dust thus is subjected to pretreatment 1 wherein the particle size of the dust may be reduced to a convenient particle size, which is suitable for feeding to the process, such as, for example, a size of one centimeter or less. The pretreatment to the desired particle size may be accomplished by feeding dust to size-reduction equipment, such as a hammermill, screening out the undersize material, returning oversize material to the mill and feeding the pretreated dust to sulfuric acid treatment 2. Simple size reduction to particle sizes smaller than about 6M (mesh, Tyler Series) is unnecessary as the present process can treat coarse material without difficulties.

Alternatively, pretreatment may be accomplished by wet-grinding flue dust in an aqueous slurry followed by separating the ground dust from the liquid. Wet-grinding has advantages when the flue dust has a high content of water-soluble constituents. Wet-grinding not only reduces the particle size of the dust but solubilizes significant quantities of the soluble constituents. We have found that the separated liquid contains amounts of potassium and phosphate values which makes the recovery of these values, for example as fertilizer, economically feasible. After separation from the liquid, the wet-ground dust may be partially dried, if so desired, before being fed to sulfuric acid treatment 2.

In sulfuric acid treatment 2, the pretreated dust is treated with sulfuric acid for the conversion of metal values in the dust to sulfates and for the elimination of at least a portion of fluorine. Pretreated dust is mixed with sulfuric acid, heated to an elevated temperature and agitated for a period of time of sufficient duration to effect the desired degree of leaching.

In one method of the acid treatment 2, dust is mixed with sulfuric acid in an amount sufficient to provide in the resulting leach solution 15 to 25% free acid found necessary to ensure high extractions of metal values. The mixture of dust and acid is heated to a temperature in the range of 60° to 100° C. and is agitated for a period in the range of one half hour to 6 hours. During the reaction, metal values are converted to sulfates, and fluoride in the dust reacts with the acid and silica to form silicon tetrafluoride which evolves from the reaction mixture. If so desired, the pressure over the reaction mixture may be reduced below atmospheric to enhance the removal of fluorine. The leach solution is separated from the leach residue in liquid-solids separation 4.

The high, free acid concentration in the leach solution can cause corrosion in the acid treatment 2 and in subsequent process steps. This may be alleviated by using corrosion-resistant equipment, which, however, is expensive.

We have found that high extractions and good fluorine removal can also be obtained, while maintaining the free-acid concentration in the leach solution low to minimize corrosion, preferably by subjecting the dust to a two-stage treatment comprising a sulfation with a limited amount of concentrated sulfuric acid followed by an aqueous leach. According to this preferred method, dust is mixed with concentrated sulfuric acid of, for example, 93% strength in a limited amount sufficient to convert metal values to sulfates and to provide 1 to 4% free acid in the subsequent aqueous leach. This low amount of free acid alleviates corrosion problems and obviates the need for expensive corrosion-resistant equipment in subsequent processing.

The variables of temperature and mixing time must be controlled to ensure adequate mixing and conversion as well as adequate fluorine removal. These variables also control the fluidity of the acid-dust mixture. To maintain the necessary fluidity of the mixture, the temperature should be at least 100° C. and should preferably be maintained in the range of 100° to 250° C. A mixing time of at least 15 minutes is necessary to ensure adequate mixing and sulfation. A mixing time in the range of 1 to 2 hours is preferred.

The sulfuric acid treatment according to the preferred method is carried out in a suitable mixing device, such as, for example, a pug-mill or a blunger. The mixing device may be externally heated to maintain the mixture at the desired temperature. The evolved gases are scrubbed and, upon completion of the sulfation, the reaction mixture is discharged from the mixing device and fed to leach 3.

In leach 3, the sulfated mixture is slurried with acid wash-solution from the subsequent washing of the leach residue and the mixture is leached to dissolve the soluble constituents and to crystallize gypsum in readily-separable form. The leach is preferably carried out in a single-compartmented leach vessel, or in two leach vessels connected in series. Sulfated mixture and wash-solution are fed to and slurried in the first vessel and leach residue and leach solution are discharged from the second vessel.

The leach is conducted at a temperature in the range of 60 to 100° C. The temperature may be maintained by suitable means, such as, for example, by the use of steam. To maintain solubility of the leached products, and to prevent corrosion of stainless steel equipment, the concentration of free sulfuric acid in the slurry is maintained in the range of 1 to 4%. Concentration of free acid is mainly controlled by the amount of sulfuric acid added in sulfuric acid treatment 2, as described above, and is further controlled by the acid content of the wash-solution. The free acid concentration may be adjusted by evaporation of wash-solution or by addition of water.

The leach residue is separated from the leach solution in liquid-solids separation 4. Liquid-solids separations and washing of the solids in the process are carried out using standard practises, methods and equipment. Adequate washing ensures improved separation of values.

To minimize loss of gallium, zinc and phosphate with the leach residue, the residue is washed in a countercurrent system comprising at least two stages (not shown). After liquid-solids separation and following the washing, the acid wash solution is returned to the leach 3. If so desired, the wash solution may be evaporated or diluted to adjust its specific gravity, prior to being fed to leach 3.

The washed leach residue which contains silver, zinc, gypsum and silica may be further treated for the recovery of metal values. The leach solution is treated in precipitation 5 for removal of a major portion of the zinc.

We have found that zinc can be effectively precipitated from the leach solution as zinc ammonium sulfate hexahydrate (ZAS), represented by the formula $(NH_4)_2Zn(SO_4)_2.6H_2O$, which is only slightly soluble in solutions containing at least 100 g/l ammonium sulfate and preferably containing ammonium sulfate in the range of 100 to 200 g/l. The required ammonium sulfate concentration may be provided in precipitation 5 by adding ammonium sulfate in the required amount, or by adding ammonia and/or sulfuric acid in controlled amounts to the leach solution. The pH of the solution is preferably monitored and maintained at values in the range of 1 to 2, and preferably at a value of 1.5, by controlled addition of ammonia and/or acid. The addition of ammonia and/or acid is continued until the solution contains ammonium sulfate in the aforeaid range of 100 to 200 g/l.

To ensure maximum precipitation of ZAS, the temperature of the solution should be lowered as much as is practical, for example, to 25° C. or lower. In case of addition of ammonium sulfate, the solution may be heated to, for example, 60° to 100° C. and then cooled, to facilitate crystal growth. Depending on the composition of the flue dust, the specific gravity of the solution may be adjusted to enable easy separation of the precipitated ZAS crystals from solution and to prevent other salts from precpitating. The specific gravity of leach solution should preferably be in the range of 1.2 to 1.5.

The ZAS crystals, which are essentially free of gallium, are separated from solution in liquid-solids separation 6, washed with a solution containing at least 100 g/l ammonium sulfate and are recovered and may be further processed, e.g. into zinc-containing fertilizer.

In cases wherein the flue dust contains cadmium, cadmium will coprecipitate with the ZAS. Cadmium may be recovered by redissolving the ZAS crystals, cementing the cadmium with zinc dust and recrystallizing ZAS from the cadmium-free solution.

Using this method of zinc precipitation, the concentration of zinc in the solution may be reduced to about 1 g/l. The solution is subsequently treated by first concentrate precipitation 7 in which solution from liquid-solids separation 6 is treated with an alkaline material to precipitate the first gallium-containing concentrate. This concentrate is a complex product of variable composition and comprises substantially all gallium, aluminum and fluorine originally present in the solution, a substantial amount of phosphate, as well as amounts of sodium, potassium, ammonium and sulfate.

Prior to adding alkaline material, the specific gravity of the solution is adjusted, depending on the composition of the flue dust, to a value sufficient to prevent precipitation of phosphates. The specific gravity is adjusted to within the range of 1:1 to 1.3. The solution is then heated to a temperature in the range of 60° to 100° C. and the pH of the solution is raised to a value in the range of 3.5 to 5.0 by the addition of an alkaline material such as, for example, ammonia or ammonium hydroxide. Precipitation of the concentrate is complete after agitating the resulting slurry for about one hour.

As it appears that for a given weight of aluminum the weight of phosphate contained in the first concentrate is directly related to the weight of fluorine in solution, it is important that as much fluorine as feasible be removed from the process prior to the precipitation of the first concentrate. The prior removal of a major portion of fluorine can be effectively accomplished in the preferred method of sulfuric acid treatment 2, described above, by carrying out the sulfuric acid treatment at temperatures and with retention times in the upper region of the recited ranges.

The first gallium concentrate is separated from the first gallium-free solution in liquid-solids separation 8 and the concentrate is washed with water to remove soluble compounds. The first gallium-free solution and wash solution, which contain mainly sodium, potassium and ammonium sulfates and phosphates, are treated for the recovery of these compounds, for example, as fertilizer. The solutions are substantially free of gallium, i.e., contain typically 1 to 2 mg/l gallium or less. The washed, first gallium-containing concentrate, which may contain about 1% gallium, a 20 to 50 times concentration of the gallium content of the dust, may be further upgraded as will be described under the description of the second embodiment of the process of the invention.

According to the second embodiment of the invention, flue dust is treated according to the process as has been described above, to give a first gallium concentrate, which is then upgraded as will be described hereinbelow.

The first concentrate is fed to an alkaline precipitation-and-leach step 9 in which the concentrate is slurried with water and lime is added to precipitate and remove phosphate as calcium phosphate. Any sulfate present is precipitated as gypsum. The lime is preferably first slurried with water and then added to the slurry of the concentrate.

The amount of lime is determined by the phosphate content of the concentrate, which may be as high as 50% $P_2O_5$, and is added in an amount at least stoichiometric to the phosphate content. Phosphate is preferentially precipitated while some gallium and aluminum compounds may coprecipitate. The slurry is agitated for a first period of at least one hour and is maintained at a temperature in the range of 60° to 100° C.

After the period required for the formation of calcium phosphate, an amount of a suitable alkaline material such as, for example, potassium hydroxide or sodium hydroxide, is added to leach and redissolve coprecipitated gallium and aluminum compounds from the precipitate. Alkaline material is added in an amount sufficient to raise the pH to and maintain the pH at a value of at least 11. The precipitation-and-leach step 9 can be carried out in the same vessel, but in order to obtain a good separation of phosphate from gallium, it is essential that the phosphate is first precipitated with lime before the alkaline material is added to dissolve gallium. Agitating the slurry with the required amount of alkaline material for a second period of at least one hour dissolves substantially all gallium and aluminum, and a residual precipitate remains.

The slurry is discharged from step 9 and is subjected to liquid-solids separation 10. The solids fraction, comprising the residual precipitate, is washed and is treated for the recovery of values. Preferably, the residual precipiate is recycled to sulfuric acid treatment 2. If so desired, at least a portion of the residual precipitate may be recycled to leach 3, in which case the acid content in the leach must be adjusted.

The liquid fraction from liquid-solids separation 10, which is a gallate-aluminate-containing solution, may be directly treated in upgraded gallium-concentrate precipitation 13 wherein the liquid is neutralized with acid for the formation of said upgraded gallium concentrate. Preferably, sulfuric acid, for example, of 93% strength, is added to lower the pH to a value of about 6. A pH of about 6 represents the point at which the gallium precipitate reaches its minimum solubility. The precipitation is carried out at a temperature in the range of 60° to 100° C. and for a time of sufficient duration to obtain a precipitate which can be easily separated from solution. The upgraded gallium concentrate is subsequently separated from solution in liquid-solids separation 14 to yield the second gallium-free solution. The solids are washed and recovered.

If so desired, aluminum may be removed from upgraded concentrate by dissolving the concentrate, adding a suitable calcium compound to precipitate calcium aluminate, removing the precipitate (not shown) and treating the solution for the reprecipitation of upgraded gallium concentrate as described.

Alternatively, in the preferred method, the liquid fraction from liquid-solids separation 10 is first treated in aluminum precipitation 11, followed by liquid-solids separation 12. In aluminum precipitation 11, aluminum is precipitated as calcium aluminate. A suitable calcium compound is added to the liquid fraction from separation 10, preferably in the form of a slurry of lime or calcium hydroxide, and in an amount which is at least stoichiometric and preferably one to two times stoichiometric to the amount of aluminum in the liquid. The pH should be maintained at a value of at least 10, and preferably of at least 11, to prevent gallium from precipitating. The temperature of the liquid is maintained in the range of 60° to 100° C. The mixture of liquid and calcium slurry is agitated for a period of time to complete the reaction, usually at least two hours, and is then subjected to liquid-solids separation 12. The separated solids are washed and removed from the process, and the gallate solution is then treated in upgraded gallium-concentrate precipitation 13, followed by liquid-solids separation 14, as described above.

The upgraded gallium concentrate which may contain, for example, 20% gallium, represents 70 to 90% of the gallium originally present in the flue dust. Upgraded gallium concentrate may be further processed for the recovery of gallium metal.

According to the third embodiment of the invention, flue dust is treated according to the process as described above to obtain upgraded gallium concentrate which is treated in dissolution step 15 wherein the concentrate is dissolved by mixing said concentrate with an alkaline solution such as a sodium hydroxide solution. Alternatively, the concentrate may be repulped with water and solid sodium hydroxide may be added. The dissolved concentrate is then subjected to electrolysis 16 which is carried out according to conventional practice. Gallium metal is recovered from the electrolysis and spent electrolyte may be removed from the process or may be recycled to precipitation-and-leach step 9. If so desired, a portion of the spent electrolyte may be recycled to dissolution step 15, as indicated by the broken line in the accompanying drawing.

The gallium metal, recovered from this process, may have a purity of about 99%, the main impurity being zinc. If so desired, this gallium metal can be further purified for the production of high-purity gallium for electronic purposes.

The process will now be illustrated by means of the following non-limitative examples. In the examples, all percentages are given as percentages by weight.

EXAMPLE 1

This example illustrates that a direct aqueous leach of flue dust with a limited amount of sulfuric acid results in low extraction of gallium.

A total of 3.6 kg. of a flue dust containing 0.05% Ga was fed to a first lead-lined leach vessel at a rate of 10 g/min. 93% $H_2SO_4$ was fed to the vessel at a rate of 4 g/min and wash solution from a subsequent washing was added at a rate of 32 ml/min. The mixture was reacted for one hour at 85° C. and was then allowed to overflow into a second leach vessel from which it was periodically removed for filtration. The filter cake was washed in a two-stage displacement operation and the wash filtrate was returned to the first leach vessel. The filtrate from the filtration had a volume of 81 and contained 3.5% free $H_2SO_4$ and 0.125 g/l Ga, indicating that only 55% of the gallium had been leached from the flue dust.

EXAMPLE 2

This example illustrates a direct leach of flue dust with sulfuric acid in an amount which results in a high extraction of gallium, but which yields a high free-acid concentration in the leach solution which may create corrosion or may require expensive equipment in subsequent process steps.

Using the apparatus and procedure described in Example 1, 10.125 kg flue dust containing 0.05% Ga were fed at a rate of 24 g/min. Simultaneously 93% $H_2SO_4$ at a rate of 24 g/min and wash solution at a rate of 52 ml/min were added. The retention time of the reaction mixture was 30 min. and the temperature 80° C. After filtration, 13.5 l filtrate was obtained which contained 23% sulfuric acid and 0.355 g/l Ga. In this case 95% of the gallium was extracted from the flue dust.

EXAMPLE 3

This example illustrates that high extraction of gallium from flue dust is possible, while maintaining the free-acid concentration in the leach solution low whereby corrosion can be minimized. 3380 kg (dry basis) flue dust with the average composition as shown in Table 1 were passed through a 6 mesh vibrating screen. The oversize material was reduced in a hammermill and rescreened. The screened flue dust was continuously fed at a rate of 500 g/min. into a blunger which was externally heated to 150° C. Sulfuric acid (93%) was pumped to the blunger at a rate of 210 g/min., sufficient to give a free-acid content of 1–4% in the subsequent leach. The acid-dust mixture was agitated for one hour and then transferred to the first of two 900 l capacity leach tanks. Wash solution having a specific gravity of 1.1 from a subsequent filtration step, was added at a rate of 1 l/min. The leach slurry was maintained at 80° C., at a bulk density of 1.4 g/ml and an average free-$H_2SO_4$ concentration of 2.5%. The $H_2SO_4$ concentration was controlled by suitable adjustment of the $H_2SO_4$ addition rate to the blunger and the rate of addition of wash solution to the leach tank. The resulting slurry was allowed to overflow into the second leach tank.

Periodically, 200l batches of leach slurry from the second tank were filtered on a rotary drum vacuum filter. The separated residue was washed in a two-stage countercurrent operation and the wash solution was transferred to a holding tank for subsequent addition to the first leach tank. The leach residue weighed 2166 kg (dry basis) and had the average composition as shown in Table 1. The leach solution had a total volume of 6590 l, an average specific gravity of 1.273 and an average composition as shown in Table I. In this case 86% of the gallium had been leached from the flue dust.

950 l leach solution, having a specific gravity (SG) of 1.32, were diluted to 1025l (SG 1.30, free $H_2SO_4$ content 0.9%) and 266 kg ammonium sulfate were added. The mixture was heated to 80° C. and then cooled to 24° C. The resulting slurry was filtered and the filtercake washed with 110l solution containing 100 g/l ammonium sulfate. 239 kg ZAS, which contained less than 0.001% Ga and 1,182l filtrate (SG 1.24, pH 1.8) were obtained. The SG of the filtrate was adjusted to 1.14 by dilution to 2,250l to form the zinc-free filtrate.

The zinc-free filtrate was heated to 80° C. and ammonia was injected in an amount to raise the pH to 4.0. After agitating for one hour, the resulting slurry was filtered yielding 1,970l first gallium-free solution (SG 1.15) and 255 kg solids. The solids were repulped in hot water, agitated for 4 hours and filtered, yielding 2,110l additional gallium-free solution and 185 kg wet, first gallium concentrate (80.2% moisture).

The first gallium concentrate was reslurried with water to a volume of 1,110 l, the temperature of the slurry was raised to 90° C. and 35 kg lime slurried in 200l water were added. The resulting slurry was agitated for one hour, then 10 kg sodium hydroxide were added and agitation was continued for an additional

Table I

| Material | Ga | Zn | Ag | $Al_2O_3$ | $P_2O_5$ | CaO |
|---|---|---|---|---|---|---|
| flue dust | 0.048% | 10.4% | 0.07% | 1.5% | 32.6% | 7.1% |
| leach residue | 0.010% | 6.3% | 0.11% | 0.5% | 2.4% | 12.6% |
| leach solution | 0.212 g/l | 27.5 g/l | <.002 g/l | 6.5 g/l | 12.6% | — |

| Material | $SiO_2$ | $K_2O$ | $SO_4$ | F | $Na_2O$ | Cl |
|---|---|---|---|---|---|---|
| flue dust | 14.0% | 15.9% | — | 1.90% | 3.1% | 1.0% |
| leach residue | 19.0% | 9.2% | 13.5% | 0.4% | 0.4% | 0.1% |
| leach solution | <0.1% | 2.4% | 3.0% | 0.3 | 12.5 g/l | 4.0 g/l |

EXAMPLE 4

To demonstrate the improved recovery of values by additional washing of leach residue, 100 g of a wet leach residue, obtained according to the procedure described hour. The slurry was filtered, the filtercake was repulped with hot water, stirred for one hour and filtered, yielding 181 kg wet, precipitation-and-leach solids (62.9% moisture). A total of 1,220 l precipitation-and-leach solution (SG 1.01, pH 12.4) were obtained.

Table II

| Material | Ga | Zn | $Al_2O_3$ | $P_2O_5$ | CaO | $K_2O$ | $SO_4$ | F | $NH_4$ |
|---|---|---|---|---|---|---|---|---|---|
| leach solution | 0.240 g/l | 32. g/l | 7.2 g/l | 14.3% | — | 2.6% | 3.1% | — | — |
| Zn - free filtrate | 0.095 g/l | 1.2 g/l | — | 6.1% | — | 1.3% | 3.0% | — | 2.0% |
| first Ga - free solution | 0.001 g/l | — | — | 6.0% | — | 1.5% | 3.2% | — | 3.2% |
| additional Ga - free solution | <0.001 g/l | — | — | 0.8% | — | 0.2% | 0.4% | — | 0.2% |
| first Ga concentrate* | 0.60% | 4.0% | 15.1% | 38.1% | — | 7.4% | 1.3% | 7.9% | 4.0% |
| precipitation-and-leach solids* | 0.05% | 1.9% | 5.4% | 21.7% | 43.1% | — | 0.6% | 3.7% | — |
| precipitation-and-leach solution | 0.135 g/l | — | 2.6% | — | — | — | — | — | — |
| second Ga - free solution | 0.035 g/l | — | — | — | — | 0.3% | 0.7% | — | — |
| upgraded Ga concentrate* | 1.96% | 1.3% | 22.7% | 6.5% | — | 2.0% | — | 2.6% | — |

*figures are on a dry basis in Example 3 and containing 40% moisture, 0.012% Ga, 6.4% Zn and 5.35% $P_2O_5$ were slurried with 1 l hot water, agitated for 30 min. and filtered, yielding 46.9 g wet residue containing 35% moisture. On a dry basis, the residue contained 0.012% Ga, 1.1% Zn and 2.25% $P_2O_5$. This additional washing of the leach residue improves the total gallium recovery by leaching to over 90%.

EXAMPLE 5

This example illustrates the processing of leach solution by precipitating zinc ammonium sulfate hexahydrate (ZAS) by the addition of ammonium sulfate, precipitating a first gallium concentrate and upgrading of first-gallium concentrate to obtain upgraded gallium concentrate. The anaylses of the various solid and liquid fractions obtained are tabulated in Table II.

The precipitation-and-leach solution was heated to 80° C. and 93% $H_2SO_4$ was added to reduce the pH to 6.1. The solution was stirred for one hour and filtered, yielding 1,110l second gallium-free solution (SG 1.02) and 48 kg wet, upgraded-gallium concentrate (85.6% moisture). The overall gallium recovery up to this stage is 58%. As will be shown in the following examples, the recovery can be improved significantly.

EXAMPLE 6

This example illustrates the precipitation of zinc as ZAS from a leach solution by simultaneous addition of sulfuric acid and ammonia. The analyses of the leach solution, ZAS and zinc-free filtrate are tabulated in Table III.

To 1,210l leach solution (SG 1.28, free $H_2SO_4$ 3.4%) were added 200 kg 93% $H_2SO_4$ and, simultaneously, an amount of gaseous ammonia sufficient to maintain the pH of the solution at 1.5. The solution was cooled to 20° C. and filtered. The filtercake was washed with 170 l solution containing 100 g/l ammonium sulfate. 191 kg. dry, crystalline ZAS were obtained. The 1,310 l filtrate was diluted to give 1,960l zinc-free filtrate (SG 1.14).

Table III

| Material | Ga | Zn | $Al_2O_3$ | $P_2O_5$ | $K_2O$ | $SO_4$ | $NH_4$ |
|---|---|---|---|---|---|---|---|
| leach solution | 0.180 g/l | 21 g/l | 9.6 g/l | 13.5% | 1.6% | 3.4% | — |
| ZAS | <0.001% | 14.4% | — | 0.1% | 2.0% | 11.6% | 6.2% |
| Zn-free filtrate | 0.090 g/l | 0.7 g/l | — | 7.4% | 1.0% | 3.4% | 2.3% |

The results show that 94.6% of the zinc has been precipitated and that less than 1% of the gallium is lost with the ZAS.

EXAMPLE 7

To demonstrate improved gallium recovery to be obtained by additional washing of the precipitation-and-leach solids, 100 g. wet, precipitation-and-leach solids, obtained according to the procedure described in Example 5, and containing 59.4% moisture and 0.067% Ga on a dry basis, were repulped with 0.5 l hot water and filtered. The wet filtercake weighed 72 g. and contained 47.1% moisture and 0.037% Ga on a dry basis. About one half of the gallium in the solids is recovered by this simple washing.

EXAMPLE 8

This example illustrates the removal of aluminum from a gallium concentrate obtained from flue dust and the upgrading of this concentrate.

360 kg of a wet, gallium concentrate (84% moisture) containing on a dry basis 2.2% Ga and 29.5% aluminum as $Al_2O_3$ were dissolved in hot water containing 90 kg NaOH.

18 kg. lime slurried in 360l water were added to the solution and the resulting slurry was heated to 80° C., agitated for 2 hours and filtered. The filtercake weighed 101.2 kg wet (45% moisture) and contained, on a dry bsis 0.076% Ga. The filtrate was treated with an additional 72 kg lime slurried in 300l water for 3 hours at 80° C. to precipitate calcium aluminate. The slurry was filtered and the solids repulped with 600 l water and again filtered. 250 kg wet solids (69.2% moisture) were obtained which contained on a dry basis 0.14% Ga.

All filtrates were combined and 93% $H_2SO_4$ was added until the pH reached a value of 6.0. The precipitated solids were separated yielding 40 kg. of wet upgraded gallium concentrate (85.6% moisture) containing on a dry basis 19.4% Ga and 27.9% $Al_2O_3$. The final solution contained 0.005 g/l Ga. The recovery of gallium was 87.5% and the removal of aluminum was 90%.

EXAMPLE 9

This example illustrates the retreatment of precipitation-and-leash solids to redissolve gallium and phosphate values, to recover the latter in the first gallium-free solution, to recover the former in a first-gallium concentrate and to upgrade this concentrate. The analyses of the various solids and liquids are tabulated in Table IV.

878 kg precipitation-and-leash solids (dry bais) from previous work were slurried in 1,350l water and wash solution from a subsequent filtration step and leached at 80° C. with 815 kg 93% $H_2SO_4$ for a period of at least one hour. The slurry was filtered and the solids were washed in a two-stage countercurrent operation. A total of 847 kg leach residue (dry basis) and 3,120l solution were obtained. About 90% of the gallium in the solids is redissolved.

1,560 of the 3,120 l solution, or one half, was treated. The 1,560l were diluted to give a leach solution (SG 1.11, pH 1.5).

The leach solution was heated to 80° C. and ammonia was added until the pH was 4.0. The solution was agitated for one hour and filtered yielding 1,910l first gallium-free solution (SG 1.09). The filtercake was reslurried, the slurry heated to 82° C., agitated for 1.5 hours and filtered to give 1,730l additional first gallium-free solution (SG 1.01) and 332 kg wet first gallium concentrate (73.3% moisture). This concentrate contains about 90% of the gallium contained in the leach solution.

The first gallium concentrate was slurried in water at 80° C. and a slurry of 85 kg. lime was added. The resulting slurry was agitated for one hour, then 21 kg. sodium hydroxide were added and agitation continued for 45 min. The slurry was filtered, the filtercake was repulped in 400l water, stirred for one hour and refiltered. 362 kg. wet second precipitation-and-leach solids (61.9% moisture) and 1,030l precipitation-and-leach solution (SG 1.02, pH of 12.5 ) were obtained.

The precipitation-and-leach solution was treated with 93% $H_2SO_4$ at 80° C. until the pH was 5.9. After agitating for one hour, the resulting slurry was filtered yielding 895l second gallium-free solution (SG 1.01) and 64.8 kg. wet, upgraded gallium concentrate (86.1% moisture).

It follows that by retreating the precipitation-and-leach solids, at least one third of its gallium content can be recovered in upgraded concentrate.

Table IV

| Material | Ga | Zn | $Al_2O_3$ | $P_2O_5$ | CaO | $K_2O$ | $SO_4$ | F | $NH_4$ |
|---|---|---|---|---|---|---|---|---|---|
| precipitation-and-leach solids* | 0.067% | 1.1% | 4.0% | 24.8% | 35.3% | 0.5% | 2.7% | 2.1% | — |
| leach residue* | 0.007% | 0.2% | 0.5% | 2.6% | 35.8% | 0.4% | 20.9% | 0.1% | — |
| leach solution | 0.165 g/l | 7.0 g/l | 9.5 g/l | 7.1% | — | 0.7% | 3.6% | 0.4% | — |
| first Ga-free solution | <0.001 g/l | 2.2 g/l | 0.2 g/l | 3.2% | — | 0.4% | 2.4% | 0.02% | 1.6% |
| additional first Ga-free solution | 0.001 g/l | 0.2 g/l | — | 0.6% | — | 0.1% | 0.5% | 0.01% | 0.4% |
| first Ga concentrate* | 0.250% | 6.0% | 14.4% | 39.0% | — | 3.3% | 0.7% | 8.2% | 3.8% |
| second precipitation-and-leach solids* | 0.034% | 3.0% | 5.5% | 24.5% | 41.7% | 0.2% | 0.5% | 4.5% | <0.1% |
| precipitation-and-leach solution | 0.180 g/l | — | 7.6 g/l | 0.1% | — | 0.2% | 0.05% | 0.06% | 0.1% |
| second Ga-free solution | 0.040 g/l | — | — | 0.02% | — | 0.2% | 0.9% | 0.01% | 0.1% |
| upgraded Ga concentrate* | 1.1% | 1.1% | 34.7% | 3.6% | — | 1.7% | 8.1% | 3.8% | 0.2% |

*figures on a dry basis

EXAMPLE 10

A quantity of upgraded gallium concentrate obtained as described in Example 8 was dissolved in sodium hydroxide. The solution containing 13 g/l Ga was electrolyzed, using a stainless steel anode and a nickel alloy cathode, at an average current density of 6.5 A/dm². After 24 hours, the electrolysis was terminated, gallium metal was recovered and the residual solution was found to contain 0.33 g/l Ga, representing a recovery of more than 95%.

It will be understood, of course, that modifications can be made in the method described herein without departing from the scope of and purview of the invention as defined in the appended claims.

What I claim as new and desire to protect by Letters Patent of the United States is:

1. A process for treating phosphorus-furnace flue dust containing gallium and zinc which comprises the steps of:
    1. treating flue dust with sulfuric acid for formation of a leach solution and a leach residue;
    2. separating the leach solution from the leach residue;
    3. precipitating zinc in the leach solution in the presence of ammonium sulfate as zinc ammonium sulfate hexahydrate;
    4. separating precipitated zinc from the solution;
    5. adding an alkaline material to said solution for precipitation of a first gallium concentrate and formation of a first gallium-free solution; and
    6. separating first gallium concentrate from said first gallium-free solution for recovery of said first gallium concentrate.

2. A process as claimed in claim 1, wherein flue dust is subjected to pretreatment prior to treating dust with sulfuric acid which comprises a reduction of particle sizes of flue dust to sizes not larger than one centimeter.

3. A process as claimed in claim 1, wherein flue dust is subjected to pretreatment prior to treating dust with sulfuric acid which comprises wet-grinding flue dust in an aqueous slurry and separating ground dust from liquid.

4. A proces as claimed in claim 1, wherein the treatment of flue dust with sulfuric acid comprises the steps of:
    1. mixing flue dust with sulfuric acid in an amount sufficient to provide free acid in the resulting leach solution in the range of 15 to 25%;
    2. heating the mixture to a temperature in the range of 60° to 100° C.; and
    3. agitating the mixture for a period of time in the range of one-half to 6 hours.

5. A process as claimed in claim 1, wherein the treatment of flue dust with sulfuric acid comprises the steps of:
    1. mixing the flue dust with a limited amount of concentrated sulfuric acid;
    2. heating the mixture to a temperature of at least 100° C.;
    3. agitating the mixture for a period of time at least 15 minutes; and
    4. leaching the mixture in an aqueous solution whereby said limited amount of sulfuric acid causes a free acid concentration in the leach solution in the range of 1 to 4%.

6. A process as claimed in claim 1, wherein the treatment of flue dust with sulfuric acid comprises the steps of:
    1. mixing flue dust with a limited amount of concentrated sulfuric acid in a blunger;
    2. maintaining the resulting mixture at a temperature in the range of 100° to 250° C. for a period of time in the range of 15 minutes to 2 hours; and
    3. leaching the said mixture in an aqueous solution at a temperature in the range of 60° to 100° C. whereby said limited amount of sulfuric acid causes a free acid concentration in the leach solution in the range of 1 to 4%.

7. A process as claimed in claim 1 wherein zinc ammonium sulfate hexahydrate is precipitated in the leach solution in the presence of a concentration of at least 100 g/l ammonium sulfate.

8. A process as claimed in claim 1, wherein zinc ammonium sulfate hexahydrate is precipitated by adjusting the specific gravity of the leach solution in the range of 1.2 to 1.5, adding ammonium sulfate in an amount sufficient to provide a concentration of ammonium sulfate in solution in the range of 100 to 200 g/l, heating the solution to a temperature in the range of 60° to 100° C. and cooling the solution to 25° C. or lower.

9. A process as claimed in claim 1, wherein zinc ammonium sulfate hexahydrate is precipitated by adjusting the specific gravity of the leach solution in the range of 1.2 to 1.5, adding sulfuric acid and ammonia until the solution contains ammonium sulfate in the range of 100 to 200 g/l, maintaining the pH of the solution in the range of 1 to 2 during said addition and cooling the solution to 25° C. or lower.

10. A process as claimed in claim 1, wherein zinc ammonium sulfate hexahydrate is precipitated by adjusting the specific gravity of the leach solution in the range of 1.2 to 1.5, forming a precipitate by adding sulfuric acid and ammonia in controlled amounts until the solution contains ammonium sulfate in the range of 100 to 200 g/l, maintaining the pH of the solution at 1.5 during said addition, cooling the solution to 25° C. or lower, separating the precipitate, washing the precipitate with solution containing at least 100 g/l ammonium sulfate and recovering the precipitate.

11. A proces as claimed in claim 1, wherein the solution from step (4) is adjusted in specific gravity to a value in the range of 1.15 to 1.30, said solution is heated to a temperature in the range of 60° to 100° C. and the pH of said solution is raised to a value in the range of 3.5 to 5.0 by adding an alkaline material chosen from the group ammonia and ammonium hydroxide.

12. A process as claimed in claim 1, wherein said leach residue is treated for the recovery of values.

13. A process as claimed in claim 1, wherein said first gallium-free solution is treated for the recovery of values.

14. A process for treating phosphorus-furnace flue dust containing gallium, zinc and aluminum which comprises the steps of:
    1. treating flue dust with sulfuric acid for formation of a leach solution and a leach residue;
    2. separating leach solution from leach residue;
    3. precipitating zinc in the leach solution in the presence of ammonium sulfate as zinc ammonium sulfate hexahydrate;
    4. separating precipitated zinc from the solution;
    5. adding an alkaline material to said solution for the precipitation of a first gallium concentrate and the formation of a first gallium-free solution;
    6. separating first gallium concentrate from first gallium-free solution;
    7. mixing first gallium concentrate containing phosphate in a slurry with lime in an amount which is at least stoichiometric to the phosphate content of the concentrate to form a precipitate comprising calcium phosphate and coprecipitated gallium and aluminum compounds in a gallate-aluminate solution, adding an amount of a suitable alkaline material sufficient to raise the pH of the slurry to at least 11 whereby coprecipitated gallium and aluminum compounds are redissolved in the gallate-aluminate solution and whereby a residual precipitate remains;

8. separating said residual precipitate from said gallate-aluminate solution;

9. neutralizing said gallate-aluminate solution with acid for precipitation of upgraded gallium concentrate and formation of a second gallium-free solution; and 10. separating upgraded gallium concentrate from second gallium-free solution for recovery of upgraded gallium concentrate.

15. A process for treating phosphorus-furnace flue dust containing gallium, zinc and aluminum as claimed in claim 2 which comprises the steps of:

1. adding a suitable calcium compound to said gallate-aluminate solution of step (8) in claim 2 in an amount at least stoichiometric to the amount of aluminum in said solution for the precipitation of calcium aluminate;

2. separating precipitated aluminate from the gallate solution prior to neutralizing in step (9) in claim 2;

3. dissolving said upgraded concentrate in an alkaline solution;

4. electrolyzing alkaline solution of said upgraded concentrate for deposition of gallium and formation of spent electrolyte; and 5. recovering deposited gallium.

16. A process as claimed in claim 15, wherein the residual precipitate of step (1) of claim 3 is recycled to sulfuric acid treatment of step (1) of claim 2.

17. A process as claimed in claim 15, wherein calcium aluminate is precipitated from said gallate-aluminate solution with a slurry of a calcium compound chosen from the group of lime and calcium hydroxide in an amount of from one to two times the stoichiometric amount required to precipitate calcium aluminate at a temperature in the range of 60° to 100° C. and at a pH of at least 10, and wherein said solution and said slurry are reacted for at least two hours.

18. A process as claimed in claim 15, wherein upgraded gallium concentrate is recovered by adding sulfuric acid to said gallate-aluminate solution in an amount sufficient to lower the pH to a value of about 6, whereby said concentrate is precipitated, maintaining the solution at a temperature in the range of 60° to 100° C. and recovering said concentrate.

19. A process as claimed in claim 15 wherein said first gallium-free solution is treated for the recovery of values.

20. A process as claimed in claim 14, wherein the slurry of first concentrate and lime of step (7) is agitated for a first period of at least one hour at a temperature in the range of 60° to 100° C. wherein said suitable alkaline compound is an aqueous solution of sodium hydroxide which is subsequently added in an amount sufficient to raise to and maintain the pH of the slurry at a value in the range of 11 to 12 and wherein said slurry is agitated for a second period of at least one hour.

21. A process as claimed in claim 14, wherein spent electrolyte is recycled for redissolving calcium gallate and calcium aluminate in step (7).

22. A process as claimed in claim 14, wherein the residual precipitate of step (8) of claim 2 is recycled to sulfuric acid treatment of step (1) of claim 1.

23. A process as claimed in claim 14, wherein upgraded gallium concentrate is recovered by adding sulfuric acid to said gallate-alumunate solution in an amount sufficient to lower the pH to a value of about 6, whereby said concentrate is precipitated, maintaining the solution at a temperature in the range of 60° to 100° C. and recovering said concentrate.

24. A process as claimed in claim 14, wherein calcium aluminate is precipitated from the gallate-aluminate solution from step (2) by adding a slurry of a calcium compound chosen from the group of lime and calcium hydroxide and removing said aluminate from the solution.

* * * * *

UNITED STATES PATENT OFFICE
CERTIFICATE OF CORRECTION

Patent No. 4,071,422                 Dated January 31, 1978

Inventor(s)    Thomas L. Charlton et al.

It is certified that error appears in the above-identified patent and that said Letters Patent are hereby corrected as shown below:

Claim 15, lines 3, 5 and 10, "claim 2" should read -- claim 14 --.

Claim 21 should read -- Process as claimed in claim 15, wherein spent electrolyte is recycled for redissolving coprecipitated gallium and aluminum compound in step (7) of claim 14 --.

Claim 22, line 2, "claim 2" should read -- claim 14 --.

Signed and Sealed this

Fifth Day of September 1978

[SEAL]

Attest:

RUTH C. MASON
*Attesting Officer*

DONALD W. BANNER
*Commissioner of Patents and Trademarks*